United States Patent
Mayer-Wolf et al.

(10) Patent No.: US 10,516,620 B2
(45) Date of Patent: Dec. 24, 2019

(54) CONGESTION AVOIDANCE IN A NETWORK DEVICE

(71) Applicant: Marvell Israel (M.I.S.L) Ltd., Yokneam (IL)

(72) Inventors: Ilan Mayer-Wolf, Tel Aviv (IL); Zvi Shmilovici Leib, Tel Aviv (IL); Carmi Arad, Nofit (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 180 days.

(21) Appl. No.: 15/599,280

(22) Filed: May 18, 2017

(65) Prior Publication Data

US 2017/0339062 A1 Nov. 23, 2017

Related U.S. Application Data

(60) Provisional application No. 62/338,345, filed on May 18, 2016.

(51) Int. Cl.
*H04L 12/801* (2013.01)
*H04L 12/823* (2013.01)
(Continued)

(52) U.S. Cl.
CPC .............. *H04L 47/29* (2013.01); *H04L 47/12* (2013.01); *H04L 47/32* (2013.01);
(Continued)

(58) Field of Classification Search
None
See application file for complete search history.

(56) References Cited

U.S. PATENT DOCUMENTS

| 6,219,728 | B1 | 4/2001 | Yin |
| 7,359,321 | B1 * | 4/2008 | Sindhu ................ H04L 47/10 370/230 |

(Continued)

FOREIGN PATENT DOCUMENTS

WO    WO-2010/056158 A1    5/2010

OTHER PUBLICATIONS

IEEE Std 802.1Q, 2003 Edition, "IEEE Standards for Local and Metropolitan area networks—Virtual Bridged Local Area Networks," The Institute of Electrical and Electronics Engineers, Inc., 327 pages (May 7, 2003).

(Continued)

*Primary Examiner* — Edan Orgad
*Assistant Examiner* — Emmanuel K Maglo

(57) ABSTRACT

A network device receives a packet is received from a network, and determines at least one port, among a plurality of ports of the network device, via which the packet is to be transmitted. The network device also determines an amount of free buffer space in a buffer memory of the network device, and dynamically determines, based at least in part on the amount of free buffer space, respective thresholds for triggering ones of multiple traffic management operations to be performed based on the packet. Using the respective thresholds, the network device determines whether or not to trigger ones of the multiple traffic management operations with respect to the packet. The network device performs one or more of the traffic management operations with respect to the packet determined to be triggered based on the corresponding one of the respective thresholds.

22 Claims, 3 Drawing Sheets

(51) Int. Cl.
*H04L 12/861* (2013.01)
*H04L 12/851* (2013.01)
*H04L 12/835* (2013.01)

(52) U.S. Cl.
CPC ...... *H04L 49/9005* (2013.01); *H04L 47/2441* (2013.01); *H04L 47/30* (2013.01)

(56) References Cited

U.S. PATENT DOCUMENTS

| | | | | |
|---|---|---|---|---|
| 9,246,813 | B2* | 1/2016 | Kim | H04L 47/11 |
| 2003/0177293 | A1* | 9/2003 | Bilak | H04L 49/90 |
| | | | | 710/56 |
| 2005/0068798 | A1* | 3/2005 | Lee | H04L 45/7453 |
| | | | | 365/49.17 |
| 2006/0149864 | A1* | 7/2006 | Chen | G06F 13/4059 |
| | | | | 710/52 |
| 2007/0219936 | A1* | 9/2007 | Arulambalam | G11B 20/10 |
| 2010/0322075 | A1* | 12/2010 | Sindhu | H04L 47/10 |
| | | | | 370/235 |
| 2012/0057601 | A1* | 3/2012 | Voruganti | H04L 12/5601 |
| | | | | 370/401 |
| 2013/0055373 | A1 | 2/2013 | Beacham et al. | |
| 2013/0258853 | A1* | 10/2013 | Sindhu | H04L 47/10 |
| | | | | 370/235 |
| 2014/0192646 | A1* | 7/2014 | Mir | H04L 43/0829 |
| | | | | 370/235 |
| 2015/0085647 | A1* | 3/2015 | Hu | H04L 47/30 |
| | | | | 370/228 |
| 2015/0109928 | A1* | 4/2015 | Yang | H04L 49/30 |
| | | | | 370/235 |
| 2016/0055118 | A1* | 2/2016 | Carlstrom | H04L 47/245 |
| | | | | 709/213 |

OTHER PUBLICATIONS

IEEE Std 802.1Q—2011 (Revision of IEEE Std.802.1Q-2005), "IEEE Standard for Local and Metropolitan Area Networks—Media Access Control (MAC) Bridges and Virtual Bridged Local Area Networks," The Institute of Electrical and Electronics Engineers, Inc., 1,365 pages (Aug. 31, 2011).
IEEE P802.1aq/D4.6, Draft Amendment to IEEE Std 802.1Q-2011, "IEEE Draft Standard for Local and Metropolitan Area Networks—Media Access Control (MAC) Bridges and Virtual Bridged Local Area Networks—Amendment XX: Shortest Path Bridging," *The Institute of Electrical and Electronics Engineers, Inc.*, 363 pages (Feb. 10, 2012).
IEEE Std 802.3-2002, "IEEE Standard for Information technology—Telecommunications and information exchange between systems—Local and metropolitan area networks—Specific requirements, Part 3: Carrier sense multiple access with collision detection (CSMA/CD) access method and physical layer specifications," The Institute of Electrical and Electronics Engineers, Inc., 379 pages (Mar. 8, 2002).
IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," The Institute of Electrical and Electronics Engineers, Inc., Sections 1-5, 2695 pages (Dec. 9, 2005).
IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation The Institute of Electrical and Electronics Engineers, Inc., 540 pages. (May 1, 2002).
Chen, "Home Network Basis: Transmission Environments and Wired/Wireless Protocols," Prentice Hall, 26 pages (2006).
U.S. Appl. No. 15/599,218, filed May 18, 2017.
IEEE Std 802.1Qau, Amendment to IEEE Std 802 1Q-2005,"Virtual Bridged Local Area Networks—Amendment 13: Congestion Notification" The Institute of Electrical and Electronics Engineers, Inc., 135 pages, Apr. 2010.
IEEE P802.1ad/D6.0, Draft Amendment to IEEE Std. 802.1Q, "IEEE Draft Standard for Local and Metropolitan Area Networks—Virtual Bridged Local Area Networks—Amendment 4: Provider Bridges," The Institute of Electrical and Electronics Engineers, Inc., 60 pages, (Aug. 17, 2005).
International Search Report and Written Opinion for PCT/IB2017/052950 dated Aug. 30, 2017 (14 pages).
IEEE Std 802.3-2005 (revision), "IEEE Standard for Information technology—Telecommunications and information exchange between systems—Local and metropolitan area networks—Specific requirements, Part 3: Carrier Sense Multiple Access with Collision Detection (CSMA/CD) access method and physical layer specifications," The Institute of Electrical and Electronics Engineers, Inc., 417 pages (2005).
IEEE Std 802.1Q™-2014 (revision of IEEE Std. 802.1Q-2011) IEEE Standard for Local and metropolitan area networks—"Bridges and Bridged Networks" IEEE Computer Society 1832 pages (2014).

* cited by examiner

CONGESTION AVOIDANCE IN A NETWORK DEVICE

CROSS-REFERENCES TO RELATED APPLICATIONS

This disclosure claims the benefit of U.S. Provisional Patent Application No. 62/338,345, entitled "Congestion Avoidance in Network Nodes," filed on May 18, 2016, which is hereby incorporated by reference herein in its entirety.

FIELD OF TECHNOLOGY

The present disclosure relates generally to network devices such as network switches, bridges, routers, etc., and more particularly, to processing packets in network devices.

BACKGROUND

Network devices, such as bridges and routers, forward packets through a network based on addresses in the packets. A network device typically includes a plurality of ports coupled to different network links. The network device may receive a packet via one port and process address information in a header of the packet to decide via which other port or ports the network switch should transmit the packet. The network device then enqueues the packet, or a packet descriptor associated with the packet, in one or more transmit queues corresponding to the one or more ports, for subsequent transmission of the packets via the one or more determined ports. When the packet is scheduled for transmission via a port, the network device dequeues the packet, or the packet descriptor associated with the packet, from the corresponding transmit queue and forwards the packet to the port for transmission of the packet via the port.

Network devices often implement various traffic management and congestion avoidance techniques to control flow of traffic to a network device when congestion occurs due, for example, to lack of sufficient resources in the network device, such as buffer space available for queueing packets awaiting transmission from the network device. Such traffic management mechanisms are conventionally triggered in a network device when use of a resource in the network device exceeds a statically defined, predetermined, threshold.

SUMMARY

In an embodiment, a method for managing traffic flow to a network device includes: receiving, at a packet processor of the network device, a packet received from a network; determining, with the packet processor, at least one port, among a plurality of ports of the network device, via which the packet is to be transmitted from the network device; determining, with the packet processor, an amount of free buffer space in a buffer memory of the network device; dynamically determining, with the packet processor based at least in part on the amount of free buffer space, respective thresholds for triggering ones of multiple traffic management operations to be performed based on the packet, including determining a first threshold for triggering a first one of the multiple traffic management operations and a second threshold for triggering a second one of the multiple traffic management operations; determining, with the packet processor using the respective thresholds, whether or not to trigger ones of the multiple traffic management operations with respect to the packet, including determining, using the first threshold, whether to trigger the first one of the multiple traffic management operations and determining, using the second threshold, whether to trigger the second one of the traffic management operations using the second threshold; and performing, with the packet processor, one or more of the traffic management operations with respect to the packet determined to be triggered based on the corresponding one of the respective thresholds.

In another embodiment, a network device comprises: a plurality of ports, a buffer memory, and a packet processor coupled to the buffer memory, the packet processor configured to receive a packet from a network, determine at least one port, among the plurality of ports of the network device, via which the packet is to be transmitted from the network device, determine an amount of free buffer space in the buffer memory, determine, based at least in part on the amount of free buffer space, respective thresholds to be used for triggering ones of multiple traffic management operations to be performed based on the packet, the packet processor being configured to determine a first threshold for triggering a first one of the multiple traffic management operations and a second threshold for triggering a second one of the multiple traffic management operations, determine, using the respective thresholds, whether or not to trigger one of the multiple traffic management operations with respect to the packet, the packet processor being configured to determine, using the first threshold, whether to trigger the first one of the multiple traffic management operations and determine, using the second threshold, whether to trigger the second one of the traffic management operations using the second threshold; and perform one or more of the traffic management operations with respect to the packet determined to be triggered based on the corresponding one of the respective thresholds.

DETAILED DESCRIPTION

In various embodiments described herein, a network device performs various traffic management operations based on received packets to manage traffic flow to ports of the network device. The various traffic management operations are triggered when use of a resource of the network device exceeds a dynamically determined threshold, in an embodiment. As an example, in an embodiment, a fill level of a packet buffer is compared to the dynamically determined threshold, and a corresponding traffic management operation is triggered if the fill level of the buffer exceeds the dynamically determined threshold. In an embodiment, when the network device receives a packet, the network device determines, based on a current status of a resource used by the network device, respective thresholds to be used for triggering ones of multiple different traffic management operations to be performed with respect to the packet. In some embodiments, the network device determines the respective thresholds further based on other factors, such as a flow to which the packet belongs, a priority of the flow to which the packet belongs, a port to which the packet is directed, etc. The network device then determines, based on the dynamically determined respective thresholds, whether or not to trigger the corresponding ones of the traffic management operations, and performs the triggered traffic management operations with respect to the packet. For example, in various embodiments, the network device, one or more of, drops the packet to signal congestion in the network device, generates a flow control message based on the packet, mirrors the packet for further analysis, etc. In an embodiment, multiple dynamic thresholds are used for triggering multiple traffic management operations. In other words, a first dynamically determined threshold is used for triggering a first traffic operation while a second dynamically determined threshold (which may or may not be the same as the first dynamically determined threshold) is used for determining a second traffic operation, even though the actual fill level of a buffer may remain unchanged. The use of dynamically determined thresholds generally improves sharing of the resource in the network device among different packet flows or different ports, for example, and improves overall traffic management and operation of the network of which the network device is a part, as compared to systems that uses static thresholds for triggering such traffic management operations, in at least some embodiment.

Figure 1:
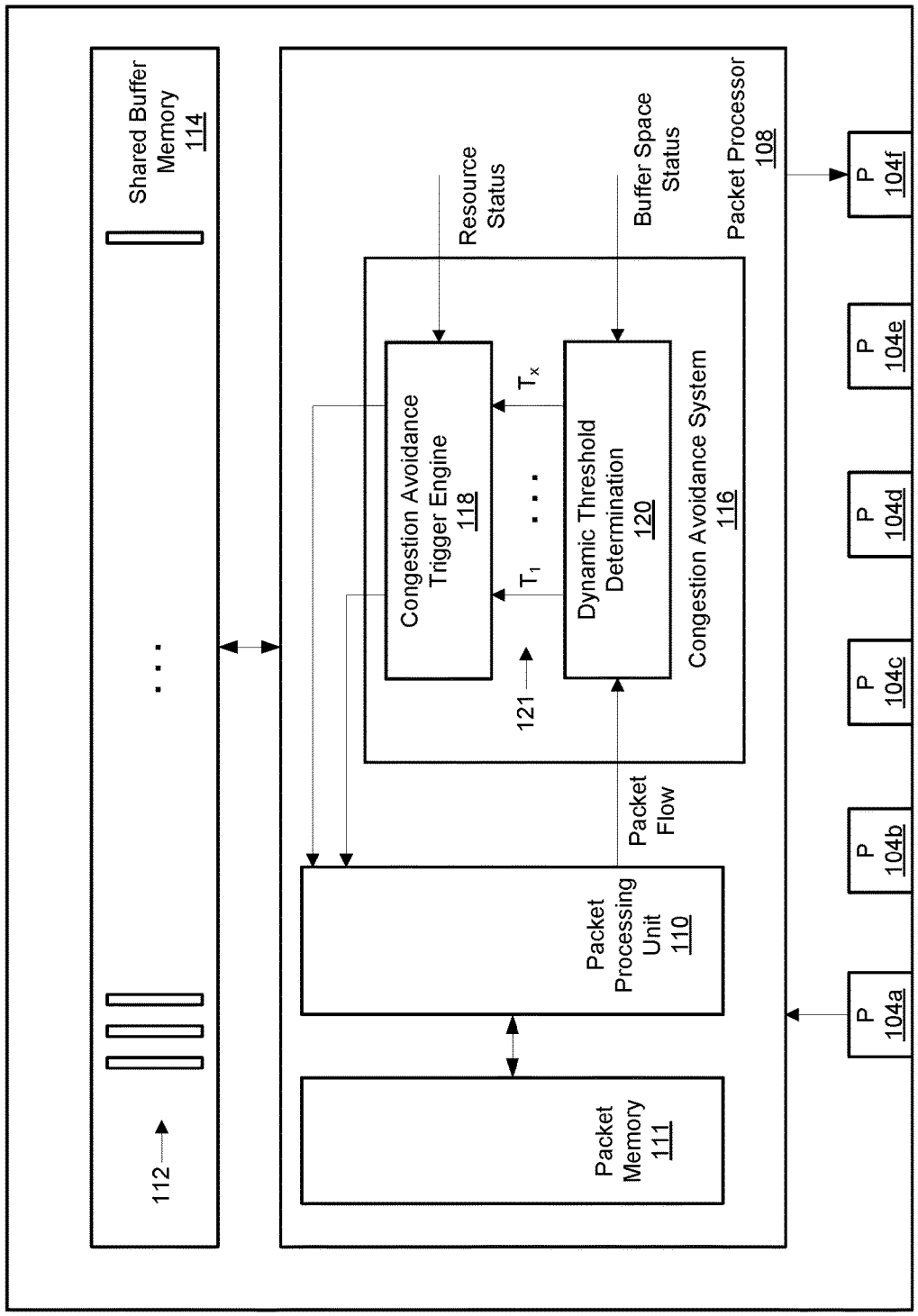
FIG. 1 is a block diagram of an example network device, according to an embodiment.

FIG. 1 is a block diagram of an example network device 100 that implements traffic management techniques described herein, according to an embodiment. The network device 100 includes a plurality of ports 104a-104f communicatively coupled to a plurality of network links (not shown). Although six ports 104 are illustrated in FIG. 1, the network device 100 includes any suitable number of ports 104 in various embodiments. In an embodiment, a packet received by the network device via a port 104 is provided to a packet processor 108 for processing of the packet. The packet processor 108 includes a packet processing unit 110. The packet processing unit 110 generally processes a packet at least to determine one or more ports 104 via which the packet is to be transmitted from the network device 100. For example, the packet processing unit 110 includes a forwarding engine (not shown) configured to determine, based on information from a header of a packet, one or more of the ports 104 to which the packet is to be forwarded. The forwarding engine includes or is coupled to a forwarding database (not shown) that stores forwarding information (e.g., port information) associated with addresses (e.g., media access control (MAC) addresses, Internet Protocol (IP) addresses, etc.) and/or other suitable information, in an embodiment. In an embodiment, the forwarding engine is configured to utilize header information to look up information in the forwarding database that indicates one or more ports 104 to which the packet is to be forwarded. The packet processing unit 110 also performs classification of the packet, for example to determine a priority with which the packet is associated, a packet flow to which the packet belongs, etc., in an embodiment.

The network device 100 includes a packet memory 111 configured to store packets while the packets are being processed by the processing unit 110, in an embodiment. In an embodiment, when the network device 100 receives a packet, the network device 100 stores at least a portion of the packet in the packet memory 111. Also, the network device 100 generates a packet descriptor associated with the packet, and the packet is processed using the packet descriptor rather than the packet itself, in an embodiment. For example, the packet processing unit 110 is configured to store the packet in the packet memory 111, generate a packet descrip-tor associated with the packet, and process the packet using the packet descriptor. In another embodiment, another suitable device or module within the network device 100 is configured to store the packet in the packet memory 111, generate a packet descriptor associated with the packet, and provide the packet descriptor to the processing unit 110 for processing of the packet. The packet descriptor contains information that the packet processing unit 110 utilizes to process the packet. When the packet is to be transmitted from the network device 100, the packet is retrieved from the memory 111 and is transferred to a port 104 for transmission of the packet, in an embodiment. For ease of explanation, the term "packet" hereinafter is used to refer to a packet itself or to a packet descriptor associated with the packet.

Packets processed by the processing unit 110 are enqueued in one of a plurality of egress queues 112 in a shared buffer memory 114 for subsequent transmission of the packets from the network device 100, in an embodiment. The egress queues 112 correspond to respective ports 104 and respective traffic flow priorities, in an embodiment. For example, a first subset of egress queues 112 corresponds to a first port 104 port (e.g., the port 104a) and is used to store packets to be transmitted via the first port 104, where respective queues 112 in the first subset of queues 112 are used to store packets that correspond to traffic flows associated with respective priorities, in an embodiment. Similarly, a second subset of egress queues 112 corresponds to a second port 104 (e.g., the port 104b) and is used to store packets to be transmitted via the second port 104, where respective queues 112 in the second subset of queues 112 are used to store packets that correspond to traffic flows associated with respective priorities, and so on, in an embodiment. In general, a packet processed by the packet processing unit 110 is enqueued in appropriate one or more egress queues 112 for subsequent transmission of the packet via the one or more ports 104 determined for the packet, in an embodiment. Subsequently, when a packet is scheduled for transmission from the network device 100, the packet is dequeued from the egress queue 112 in which the packet is queued, and forwarded to a corresponding port 104 for transmission of the packet via the port 104.

In an embodiment, the packet processor 108 includes a congestion avoidance system 116 configured to trigger various traffic management operations related to managing flow of traffic to the network device 100, for example to reduce congestion in the network device 100, to mitigate congestion at one or more downstream network devices, or upstream network devices, coupled to one or ports 104 of the network device 100, to prevent loss of packets traveling through the network device 100, etc. Although the congestion avoidance system 116 is illustrated in FIG. 1 as being separate from the packet processing unit 110, the congestion avoidance system 116 is included in the packet processing unit 110, in an embodiment. For example, the packet processing unit 110 includes a plurality of processing engines arranged in a pipeline, and the congestion avoidance system 116 is included in the packet processing unit 110 as one of the engines in the pipeline, in an embodiment. In other embodiments, the packet processing unit 110 includes one or more run-to-completion processing engines respectively configured to perform multiple processing operations, including the traffic management operations described herein, for example according to programmable instructions, on a packet.

In an embodiment, if the congestion avoidance system 116 determines that one or more traffic management operations is triggered for a particular packet, the congestion avoidance system 116 indicates to the packet processing unit 110 that the one or more traffic management operations are to be performed with respect to the packet. For example, the congestion avoidance system 116 indicates to the packet processing unit 110 that the one or more traffic management operations are to be performed with respect to the packet by including such indications in a packet descriptor associated with the packet, and passing the packet descriptor to the packet processing unit 110. The packet processing unit 110 is configured to further process the packet using the packet descriptor associated with the packet, in an embodiment. The packet processing unit 110 is configured to perform the one or more traffic management operations with respect to the packet in accordance with the indication in the packet descriptor associated with the packet, in an embodiment.

The congestion avoidance system 116 includes a congestion avoidance trigger engine 118 and a dynamic threshold determination engine 120, in an embodiment. Although the dynamic threshold determined engine 120 is illustrated in FIG. 1 as being coupled to the congestion avoidance trigger engine 118, the dynamic threshold determined engine 120 is instead included in the congestion avoidance trigger engine 118, in other embodiments. The dynamic threshold determination engine 120 is configured to dynamically determine a plurality of thresholds 121, on packet-to-packet basis, for each packet received by the congestion avoidance system 116, and to provide the dynamically determined thresholds 121 to the congestion avoidance trigger engine 118, in an embodiment. The congestion avoidance trigger engine 118 is configured to determine, using the dynamically determined thresholds 121 provided by the dynamic threshold determination engine 120, whether or not to trigger various traffic management operations for the packet, in an embodiment. In an embodiment, the congestion avoidance trigger engine 118 is configured to make the determinations for a packet based on comparisons of a current fill level of an egress queue 112 in which the packet is to be enqueued, or a current fill level of an ingress queue corresponding to the ingress port 104 via which the packet was received (and, for priority flow control, the particular ingress queue corresponding to the priority of the packet) to the respective thresholds 121 determined for the packet by the dynamic threshold determination engine 120. In an embodiment, the congestion avoidance trigger engine 118 is configured to make the various determinations for a packet independently from making other ones of the various determinations for the packet. For example, the congestion avoidance trigger engine 118 is configured to compare a fill level of a queue independently to each of the respective the respective thresholds 121 determined for the packet by the dynamic threshold determination engine 120, and to make the determinations based on the independent comparisons of the queue level to each of the respective thresholds 121. In an embodiment, the various determinations that the congestion avoidance trigger engine 118 is configured to make for a packet to be enqueued in a particular egress queue 112, include some or all of (i) determining, based on a comparison of a fill level of the particular egress queue 112 to a first threshold 121 determined for the packet by the dynamic threshold determination engine 120, whether or not the packet is to be dropped, (ii) determining, based on a comparison of the fill level of the particular egress queue 112 to a second dynamic threshold 121 determined for the packet by the dynamic determination engine 120, whether or not explicit congestion notification (ECN) mark is to be set in a header of the packet, (iii) determining, based on a comparison of the fill level of the particular egress queue 112 to a third threshold 121 determined for the packet by the dynamic threshold determination engine 120, whether or not a quantized congestion notification (QCN) message (e.g., a congestion notification message (CNM) as defined by the IEEE 802.1Qau protocol) is to be generated and sent to a sender (e.g., an originator) of the packet, (iv) determining, based on a comparison of a fill level of an ingress queue, corresponding to the port 104 (and, for priority flow control, priority of the packet), to a fourth threshold 121 determined for the packet by the dynamic threshold determination engine 120, whether or not a link level flow control message (e.g., as defined by the IEEE 802.3x protocol) and/or a pause frame or a priority flow control (PFC) message (e.g., as defined by the IEEE 802.1Qbb protocol) should be generated and sent to a downstream device directly coupled to the link on which the packet was received, (v) determining, based on a comparison of the fill level of the particular egress queue 112 to a fifth threshold 121 determined for the packet by the dynamic threshold determination engine 120, whether or not the packet should be mirrored to an analyzer for traffic management or congestion analysis or statistics, etc., in various embodiments. In other embodiments, the congestion avoidance trigger engine 118 is configured to, for a packet to be enqueued in a particular egress queue 112, make determinations regarding other suitable traffic management operations not included in the list (i)-(v) in addition to the traffic management operations included in the list (i)-(v) and/or instead of some or all of the traffic management operations included in the list (i)-(v).

The dynamic threshold determination engine 120 is configured to determine the respective thresholds 121 based on a current state of a resource at the time when the packet is received by the network device 110 or at the time that the respective dynamic thresholds are determined for the packet, for example, in an embodiment. For example, the dynamic threshold determination engine 120 is configured to determine the respective thresholds 121 based on an amount of memory currently available for storing additional packets in the network device, or an amount of memory currently available for queueing additional packet descriptors associated with packets being processed by the network device 100, for example, at the time the packet is received or at the time that the dynamic threshold determination is performed, in various embodiments. In an embodiment, the dynamic threshold determination engine 120 is configured to determine the respective thresholds 121 based, at least in part, on an amount of currently free buffer space in the shared buffer memory 114 and/or an amount of currently free buffer space in the packet memory 111. The dynamic threshold determination engine 120 determines the amount of free buffer space in the shared buffer memory 114 based on an amount of buffer space currently being used, where the amount of buffer space currently being used is a total amount of buffer space currently being used by all of the egress queues 112, or an amount of buffer space currently being used by egress queues corresponding to particular port or ports 104 and/or corresponding to particular priorities, in various embodiments. Similarly, the dynamic threshold determination engine 120 determines the amount of free buffer space in the packet memory 111 based on an amount of buffer space currently being used in the packet memory 111, where the amount of buffer space currently being used is a total amount of buffer space currently being used by all packets stored in the packet memory 11, or an amount of buffer space currently being used by packets received via particular port or ports 104 and/or corresponding to particular priorities, in various embodiments. In some embodiments, the dynamic threshold determination engine 120 determines the respective thresholds 121 further based on one or more specific sets of parameters that correspond to a priority with which the packet is associated, a flow to which the packet belongs, the particular port 104 via which the packet was received, the particular port 104 via which the packet is to be transmitted, a type of the packet, such as whether the packet is a unicast packet to be transmitted via one port 104 or a multicast packet to be transmitted via multiple ports 104, etc. For example, as will be explained in more detail below, the dynamic threshold determination engine 120 obtains, based on a flow to which the packet belong, one or more flow-specific parameters based on a flow to which a packet belongs and/or one or more port-specific parameters based on a port via which the packet is to be transmitted, and utilizes the obtained parameters in determining one or more of the respective thresholds 121 for the packet, in an embodiment.

In an embodiment, because the congestion avoidance trigger engine 116 utilizes dynamically determined thresholds for determining whether or not to trigger various traffic management operations for respective packets, the congestion avoidance trigger engine 116 makes different decisions for different packets even based on a same fill level of a queue for the different packets. Thus for example, based on a same fill level of a queue, (i) at a time $t_1$, a first traffic management operation is trigged for a first packet directed to the queue and a second traffic management operation is not trigged for the first packet directed to the queue, and (ii) at a time $t_2$, the first traffic management operation is not trigged for a second packet directed to the queue and the second traffic management operation is trigged for the second packet directed to the queue, in an embodiment.

As a more specific example, in an example scenario, the congestion avoidance trigger engine 116 makes determinations for a first packet at a time $t_1$ and directed to a first egress queue 112 based on the respective dynamic thresholds determined by the dynamic threshold determination engine 120 for the first packet at the time $t_1$. To this end, the congestion avoidance trigger engine 116 compares a fill level of the first egress queue at the time $t_1$ to each of the respective thresholds, and makes the determinations based on the comparisons of the fill level of the first egress queue at the time $t_1$ to each of the respective thresholds, in an embodiment. In an example scenario, the congestion avoidance trigger engine 116 determines (i) based on a comparison of the fill level of the egress queue 112 to a first one of the thresholds (e.g., tail drop threshold) determined for the first packet at the time $t_1$ that the first packet should be dropped and (ii) based on a comparison of the fill level of the egress queue 112 to a second one of the thresholds (e.g., QCN threshold), determined for the first packet at the time $t_1$, that a QCN message should not be generated based on the first packet.

Continuing with the same example scenario, at a time $t_2$ (e.g., during a next cycle that follows the time $t_2$), the congestion avoidance trigger engine 116 makes determinations for a second packet and directed to the first egress queue 112 based on the respective dynamic thresholds determined by the dynamic threshold determination engine 120 for the second packet at the time $t_2$. The fill level of the first egress queue 112 has not changed from the time $t_1$ to the time $t_2$, in this example scenario. However, because the dynamically determined thresholds determined for the first packet at the time $t_1$ are different from the dynamically determined thresholds determined for the first packet at the time $t_2$ (e.g., due to a change in amount of free buffer space from the time $t_1$ to the time $t_2$), the congestion avoidance trigger engine 116 determines (i) based on a comparison of the fill level of the egress queue 112 to the first one of the thresholds (e.g., tail drop threshold) determined for the second packet at the time $t_2$ that the second packet should not be dropped and (ii) based on a comparison of the fill level of the egress queue 112 to the second one of the thresholds (e.g., QCN threshold) determined for the second packet at the time $t_2$ that a QCN message should be generated based on the second packet, in an embodiment.

Dynamically determining respective threshold 121 different packets and for different traffic management operations allows for better sharing of buffer space in the shared buffer memory 114 by various ports 104 and by various traffic flows. For example, higher thresholds may be determined at a time when there is more free buffer space available in the shared buffer memory 114 and relatively lower thresholds may be determined at a time when there is less buffer space buffer space available in the shared buffer memory 114, in an embodiment. As another example, higher thresholds may be determined for packets that belong to higher priority packet flows and lower thresholds may be determined for packets that belong to lower priority packet flows, in at least some embodiments. Further, because the dynamically determined thresholds are used to generally control flow of packets to the network device 100, the dynamically determined respective threshold 121 for different packets generally improve sharing of buffer space in the packet memory 111, in at least some embodiments.

Figure 2:
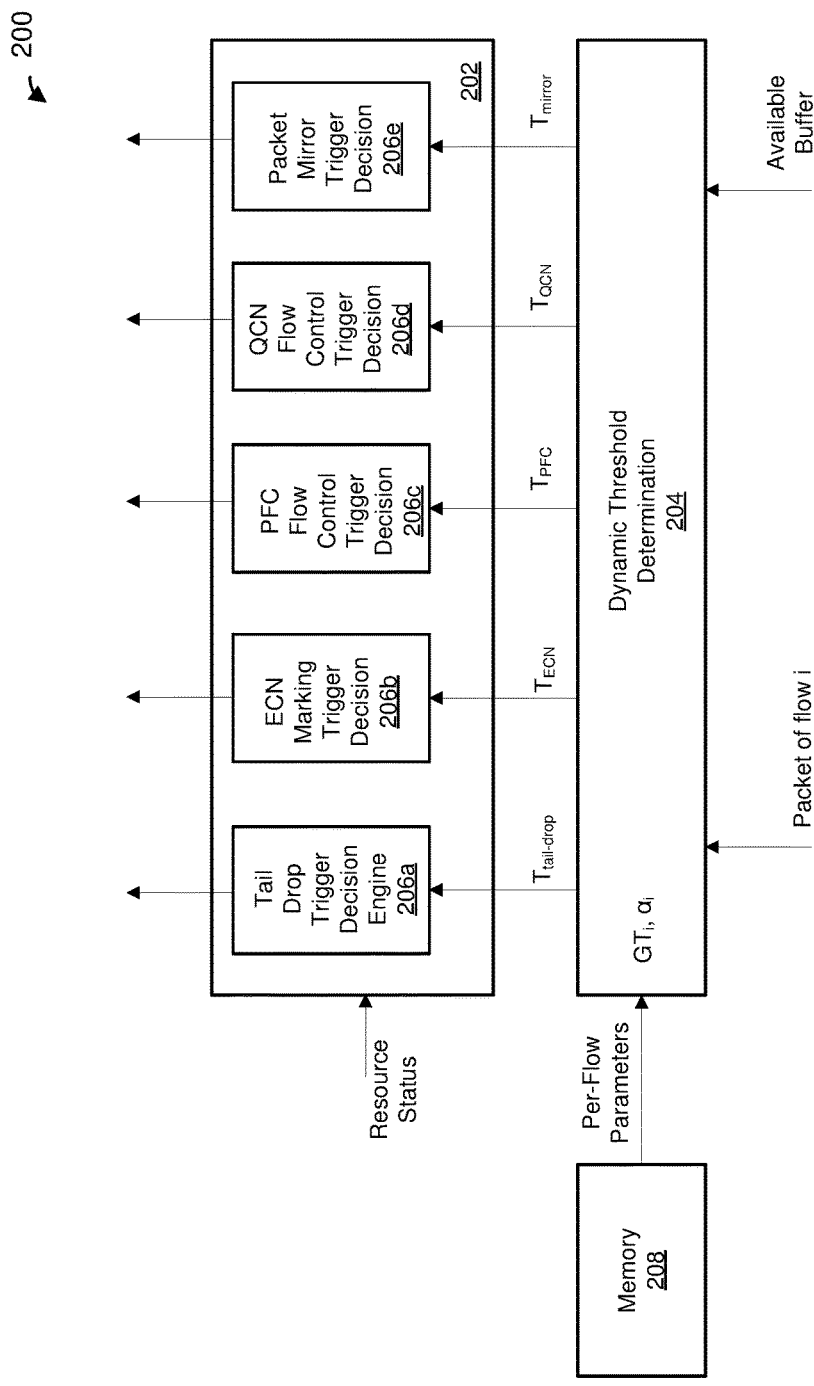
FIG. 2 is a block diagram of a congestion avoidance system used with the network device of FIG. 1, according to an embodiment.

FIG. 2 is a block diagram of a congestion avoidance system 200 used with the network device 100 of FIG. 1, according to an embodiment. In an embodiment, the congestion avoidance system 200 corresponds to the congestion avoidance system 116 of FIG. 1. In another embodiment, the congestion avoidance system 200 is used with a network device different from the network device 100 of FIG. 1. Similarly, the network device 100 of FIG. 1 utilizes a congestion avoidance system different from the congestion avoidance system 200, in some embodiments. For ease of explanation, the congestion avoidance system 200 is described with reference to the network device 100 of FIG. 1.

The congestion avoidance system 200 includes a congestion avoidance trigger engine 202 (e.g., corresponding to the congestion avoidance trigger engine 118 of FIG. 1, in an embodiment) and a dynamic threshold determination engine 204 (e.g., corresponding to the dynamic threshold determination unit engine 120 of FIG. 1, in an embodiment). The congestion avoidance trigger engine 202 includes a plurality of decision engines 206 configured to determine whether or not to trigger various traffic management operations to be performed with respect to a packet being processed by the congestion avoidance system 200, in an embodiment. For example, the congestion avoidance trigger engine 202 includes a tail drop decision engine 206a, an ECN marking decision engine 206b, a PFC flow control decision engine 206c, a QCN flow control decision engine 206d and a packet mirror decision engine 206e, in the illustrated embodiment. In other embodiments, congestion avoidance trigger engine 202 omits one or more of the decision engines 206a-206e and/or includes one or more additional decision engines other than the decision engines 206a-206e.

The dynamic threshold determination engine 204 is configured to determine a plurality of threshold 210 for each packet being processing by the congestion avoidance system 200, in an embodiment. For example, for each packet processed by the congestion avoidance system 200, the dynamic threshold determination engine 204 determines some or all of (i) a tail-drop threshold $T_{tail\text{-}drop}$ to be used for triggering a tail drop operation by the engine 206a, (ii) an ECN threshold $T_{ENC}$ to be used for triggering an ECN operation by the ECN decision engine 206b, (iii) PFC threshold(s) $T_{PFC}$ (e.g., $T_{PFC\_XON}$ and $T_{PFC\_XOFF}$) to be used for triggering a PFC operation by the PFC decision engine 206c, (iv) a QCN threshold $T_{QCN}$ to be used for triggering a QCN operation by the QCN flow control decision engine 206d, and (v) a packet mirror threshold $T_{mirror}$ to be used for triggering a packet mirror operation by the packet mirror decision engine 206e. In an embodiment, the dynamic threshold determination engine 204 determines each one of the respective thresholds $T_i$ 210 independently from determining the other ones of the respective thresholds $T_i$ 210. In another embodiment, the dynamic threshold determination engine 204 utilizes a same determination of a threshold $T_i$ for multiple ones of the respective thresholds $T_i$ 210. As just an example, the dynamic threshold determination engine 204 determines a first threshold $T_i$ for the threshold $T_{tail\text{-}drop}$ and the threshold $T_{ENC}$, and determines a second threshold $T_i$, different from the first threshold $T_1$, for the QCN threshold $T_{QCN}$, in an embodiment.

In an embodiment, to determine the respective thresholds for a packet, the dynamic threshold determination engine 204 determines one or more flow-specific and/or port-specific parameters based on a flow of the packet and/or a port to which the packet is directed. In an embodiment, the dynamic threshold determination engine 204 retrieves the one or more parameters from a memory 208 coupled to the dynamic threshold determination engine 204. In other embodiments, the dynamic threshold determination engine 204 determines the one or more parameters in other suitable manners. In an embodiment, the flow-specific parameters determined for a packet by the dynamic threshold determination engine 204 include (i) an amount of buffer space (e.g., number of buffers) guaranteed threshold for queues corresponding to the priority i of the packet and (ii) allocation factor $\alpha_i$ for queues corresponding to the priority and trop precedence of the packet. In an embodiment, the dynamic threshold determination engine 204 determines one or more thresholds $T_i$ to be used by one or more of the decision engines 206. In an embodiment, the dynamic threshold determination engine 204 initially determines a dynamic threshold $DT_i$ to be used by a particular one of the decision engines 206 according to $$DT_i = \alpha_i \times (B-C) \qquad \text{Equation 1}$$

where $\alpha_i$ is the allocation factor retrieved from the memory 208, B is a measure of the total buffer space in the shared buffer memory 114 (e.g., total number of buffers in the shared buffer memory 114), and C is the number of currently occupied buffers. In an embodiment, the dynamic threshold determination engine 204 utilizes different measures of C, in different embodiments and/or scenarios. For example, the dynamic threshold determination engine 204 utilizes a number of buffers globally occupied by all queues in the shared buffer memory 114, in an embodiment and/or scenario. In another embodiment and/or scenario, the dynamic threshold determination engine 204 utilizes a number of buffers occupied by a subset of queues that corresponds to the port 104 to which the packet is directed.

In an embodiment, the dynamic threshold determination engine 204 determines the respective final thresholds $T_i$ further based on the respective dynamic thresholds determined according to Equation 1 and the obtained respective guaranteed thresholds $GT_i$ for the respective thresholds $T_i$ and. In an embodiment, the dynamic threshold determination engine 204 determines a respective final threshold $T_i$ according to $$T_i = GT_i + DT_i \qquad \text{Equation 2}$$

where $DT_i$ is a dynamic threshold determined for the particular packet and for the particular decision engine 206 according to Equation 1 and $GT_i$ is a guaranteed threshold retrieved for the particular packet and the particular decision engine 206 packet from the memory 208, for example.

The dynamic threshold determination engine 204 provides the respective final thresholds $T_i$ to the congestion avoidance trigger engine 202 and, consequently, to the corresponding decision engines 206, in an embodiment. The respective decision engines 206, in turn, utilize their corresponding final thresholds $T_i$ to make decisions based on their corresponding final thresholds $T_i$. In an embodiment, the congestion avoidance trigger engine 202 obtains a fill level of the egress queue 112 to which the packet is directed, and provides the fill level of the egress queue to each of the engines 206a, 206b, 206d and 206e. In an embodiment, the congestion avoidance trigger engine 202 also obtains a fill level of an ingress queue that corresponds to a port 104 via which the packet was received, and provides the fill level level of the ingress queue to the engine 206c. Each engine 206 compares the fill level provided to the engine 206 to the respective threshold $T_i$ provided by the dynamic threshold determination engine 204, and makes its decision based on the comparison of the fill level to the respective threshold $T_i$. Thus, for example, in an embodiment, the tail drop decision engine 206a compares the fill level of the egress queue 112 to a threshold $T_{tail\text{-}drop}$ provided by the dynamic threshold determination engine 204, and determines that the packet should be dropped if the queue fill level exceeds the a threshold $T_{tail\text{-}drop}$, in an embodiment. In another embodiment, the tail drop decision engine 206a makes a weighted random early detection (WRED) decision. In this embodiment, the tail drop decision engine 206a compares the queue fill level to a probabilistically modified threshold $T_{tail\text{-}drop}$, and determines that the packet should be dropped if the queue level exceeds the probabilistically modified threshold $T_{tail\text{-}drop}$. As another example, the QCN flow control decision engine 206d determines, based on a comparison of the queue fill level to a threshold $T_{QCN}$ provided by the dynamic threshold determination engine 204, a feedback level Fb that represents a congestion level in the queue, and generates a quantized feedback level qFb based on the determined feedback level Fb, in an embodiment. The QCN flow control decision engine 206d then determines that a QCN message should be generated based on a probability that is proportional to the determined qFb, in an embodiment.

Figure 3:
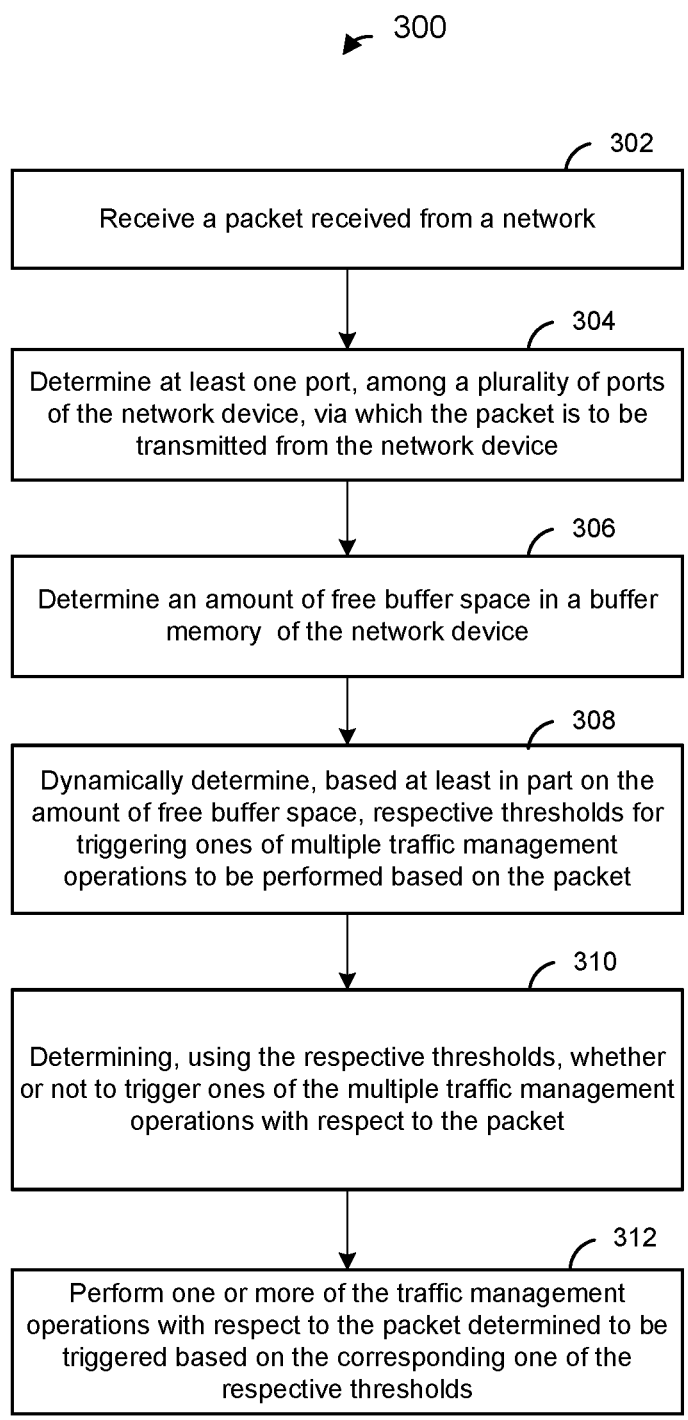
FIG. 3 is a flow diagram illustrating an example method for performing traffic management operations in a network device, according to an embodiment.

FIG. 3 is a flow diagram illustrating an example method 300 for managing traffic flow to a network device, according to an embodiment. In an embodiment, the network device 100 of FIG. 1 implements the method 300 for managing traffic flow to the network device 100, according to an embodiment. For example, the packet processing unit of the network device 100 of FIG. 1 is configured to implement the method 300, in an embodiment. In an embodiment, the congestion avoidance system 116 of FIG. 1 or the congestion avoidance system 200 of FIG. 2 is configured to implement a portion of the method 300. In other embodiments, the method 300 is implemented by a suitable network device different from the network device 100 and/or using congestion avoidance systems different from the congestion avoidance system 116 or the congestion avoidance system 200.

At block 302, a packet is received from a network by the network device. At block 304, at least one port, among a plurality of ports of the network device, via which the packet is to be transmitted is determined. In an embodiment, the at least one port is determined based on information (e.g., an address) from a header of the packet. In an embodiment, the at least one port is determined using a packet descriptor associated with the packet, wherein the packet descriptor includes the information (e.g., the address) from the header of the packet. In some embodiments, the packet descriptor additionally includes other information, such as additional information from the header of the packet, an indicator of a port at which the packet is received, an indicator (e.g., an address, a pointer, etc.) of a memory location in which the packet is stored, etc.

At block 306, an amount of free buffer space in a buffer memory is determined. For example, an amount of free buffer space in a buffer memory configured to queue packets to be transmitted via ones of ports among the plurality of ports is determined, in an embodiment. Additionally or alternatively, an amount of free buffer space in a packet memory configured to store packets being processed by the network device is determined, in an embodiment. In an embodiment, the amount of free buffer space is determined by subtracting an amount of total buffer space currently being used in the buffer memory from a predetermined amount of total buffer space is the buffer memory. In another embodiment, the amount of free buffer space is determined by subtracting an amount of buffer space currently being used by a subset of queues or ports in the buffer memory from a predetermined amount of total buffer space is the buffer memory. For example, in an embodiment, the amount of free buffer space is determined by subtracting an amount of buffer space currently being used by a subset of queues corresponding to a port, determined at block 304, from a predetermined amount of total buffer space is the buffer memory. In other embodiments and, the amount of free buffer space is determined in other suitable manners.

At block 308, respective thresholds for triggering ones of multiple traffic management operations to be performed based on the packet. In an embodiment, the respective thresholds are determined based at least in part on the amount of free buffer space determined at block 306. In an embodiment, the respective thresholds are determined further based on one or more parameters, the one or more parameters determined based on one or more of (i) a flow to which the packet belongs, (ii) a priority of a flow to which the packet belongs and (ii) a port to which the packet is directed. In other embodiments, the one or more parameters are determined, additionally or alternatively, on other suitable factors. In an embodiment, determining the respective thresholds at block 308 includes determining a first threshold for triggering a first one of the multiple traffic management operations and a second threshold for triggering a second one of the multiple traffic management operations. In an embodiment, the respective thresholds for triggering ones of multiple traffic management operations are determined according to Equations 1 and 2, and using flow-specific and traffic management operation specific parameters as described above with reference to FIG. 2. In other embodiments, the respective thresholds for triggering ones of multiple traffic management operations are determined in other suitable manners.

At block 310, it is determined whether or not to trigger ones of the multiple traffic management operations with respect to the packet. In an embodiment, determining whether or not to trigger ones of the multiple traffic management operations with respect to the packet includes determining, using the first threshold, whether to trigger the first one of the multiple traffic management operations and determining, using the second threshold, whether to trigger the second one of the traffic management operations using the second threshold. For example, it determined, using the first threshold, whether to drop the packet and determined, using the second threshold, whether to generate a QCN message based on the packet, in an embodiment. In other embodiments, the first threshold and/or the second threshold are used to determine whether or not to trigger other suitable traffic management operations. In an embodiment, determinations of whether to trigger ones of the multiple traffic management operations at block 310 are performed independently from determinations of whether or not to trigger other ones of the multiple traffic management operations. For example, a queue fill level (i) is compared to the first threshold to determine whether to drop the packet and (ii) is independently compared to the second threshold to determine whether to generate a QCN message based on the packet, in an embodiment. In an embodiment, determinations of whether to trigger ones of the multiple traffic management operations at block 310 are performed in parallel with (e.g., during a same clock cycle) with determinations of whether to trigger other ones of the multiple traffic management operations. For example, a determination of whether to drop a packet is performed in parallel with a determination of whether to generate a QCN message based on the packet, in an embodiment. At block 312, one or more of the traffic management operations with respect to the packet determined to be triggered at block 310 are performed. For example, if it is determined at block 310 that the packet should be dropped, then at block 312 the packet is dropped, if it is determined at block 310 that a QCN message should be generated, then at block 313 the QCN message is generated, and so on, in an embodiment.

In an embodiment, a method for managing traffic flow to a network device includes: receiving, at a packet processor of the network device, a packet received from a network; determining, with the packet processor, at least one port, among a plurality of ports of the network device, via which the packet is to be transmitted from the network device; determining, with the packet processor, an amount of free buffer space in a buffer memory of the network device; dynamically determining, with the packet processor based at least in part on the amount of free buffer space, respective thresholds for triggering ones of multiple traffic management operations to be performed based on the packet, including determining a first threshold for triggering a first one of the multiple traffic management operations and a second threshold for triggering a second one of the multiple traffic management operations; determining, with the packet processor using the respective thresholds, whether or not to trigger ones of the multiple traffic management operations with respect to the packet, including determining, using the first threshold, whether to trigger the first one of the multiple traffic management operations and determining, using the second threshold, whether to trigger the second one of the traffic management operations using the second threshold; and performing, with the packet processor, one or more of the traffic management operations with respect to the packet determined to be triggered based on the corresponding one of the respective thresholds.

In other embodiments, the method also includes one of, or any suitable combination of two or more of, the following features.

Determining whether to trigger ones of the multiple traffic management operations includes determining two or more of (i) whether to trigger a tail-drop operation to drop the packet, (ii) whether to trigger an explicit congestion notification (ECN) operation to include marking in a header of the packet; (iii) whether to trigger a flow control message based on the packet, and (iv) whether to trigger mirroring of the packet to an analyzer.

The method further includes determining, with the packet processor, an egress queue, among a plurality of egress queues, in which the packet is to be queued in the buffer memory; determining, with the packet processor, a current fill level of the egress queue; comparing, with the packet processor, the current fill level of the egress queue to the respective thresholds; and performing, with the packet processor, respective ones of the multiple operations based on the comparison of the fill level of the egress queue to the corresponding ones of the respective thresholds.

The method further comprises determining, with the packet processor, a flow to which the packet belongs.

Dynamically determining the respective thresholds includes determining, based on the flow to which the packet belongs, one or more flow-specific parameters to be used for determining the respective thresholds, and determining the respective threshold further using the one or more flow-specific parameters.

Determining the one or more flow-specific parameters comprises determining respective sets of one or more flow-specific parameters to be used for determining respective ones of the thresholds, including determining a first set of flow-specific parameters to be used for determining the first threshold and determining a second set of flow-specific parameters to be used for determining the second threshold, wherein values of the one or more specific parameters in the first set are different from values of corresponding one or more flow-specific parameters in the second set.

Determining the one or more flow-specific parameters comprises retrieving the one or more flow specific parameters from a memory.

Determining the one or more flow-specific parameters comprising determining one or both of (i) a guaranteed dynamic threshold and (ii) an allocation factor for allocation of free buffer space in the buffer memory to the flow to which the packet belongs.

Dynamically determining the respective thresholds includes determining a particular one of the respective thresholds based on (i) a guaranteed amount of buffer space allocated for the flow and (ii) a dynamically calculated amount of buffer space allocated to the flow, the dynamically calculated amount of buffer space being calculated based on the measure of the amount of currently available buffer space in the buffer memory.

The buffer memory is configured to queue packets to be transmitted via ones of ports among the plurality of ports of the network device.

Determining the amount of free buffer space comprises determining the amount of free buffer space by subtracting a value of a counter corresponding to an amount of a total buffer space currently used by queues in the buffer memory from a preconfigured value of a total amount of buffer space in the buffer memory.

Determining the amount of free buffer space comprises determining the amount of free buffer space by subtracting a value of a counter corresponding to an amount of a buffer space currently used by queues corresponding to a port to which the packet is directed from a preconfigured value of a total amount of buffer space in the buffer memory.

Dynamically determining the respective thresholds includes determining the first threshold for triggering the first one of the multiple traffic management operations independently from determining the second threshold for triggering the second one of the multiple traffic management operations.

In another embodiment, a network device comprises: a plurality of ports; a buffer memory configured to store packets to be transmitted via ports of the plurality of ports; and a packet processor coupled to the buffer memory, the packet processor configured to receive a packet from a network, determine at least one port, among the plurality of ports of the network device, via which the packet is to be transmitted from the network device, determine an amount of free buffer space in the buffer memory, determine, based at least in part on the amount of free buffer space, respective thresholds to be used for triggering ones of multiple traffic management operations to be performed based on the packet, the packet processor being configured to determine a first threshold for triggering a first one of the multiple traffic management operations and a second threshold for triggering a second one of the multiple traffic management operations, determine, using the respective thresholds, whether or not to trigger one of the multiple traffic management operations with respect to the packet, the packet processor being configured to determine, using the first threshold, whether to trigger the first one of the multiple traffic management operations and determine, using the second threshold, whether to trigger the second one of the traffic management operations using the second threshold; and perform one or more of the traffic management operations with respect to the packet determined to be triggered based on the corresponding one of the respective thresholds.

In other embodiments, the network device also comprises one of, or any suitable combination of two or more of, the following features.

The packet processor is configured to determining whether to trigger ones of the multiple traffic management operations at least by determining two or more of (i) whether to trigger a tail-drop operation to drop the packet, (ii) whether to trigger an explicit congestion notification (ECN) operation to include marking in a header of the packet; (iii) whether to trigger a flow control message based on the packet, and (iv) whether to trigger mirroring of the packet to an analyzer.

The packet processor is further configured to determine an egress queue, among a plurality of egress queues, in which the packet is to be queued in the buffer memory; determine a current fill level of the egress queue; compare the current fill level of the egress queue to the respective thresholds; and perform respective ones of the multiple operations based on the comparison of the fill level of the egress queue to the corresponding ones of the respective thresholds.

The packet processor is further configured to determine a flow to which the packet belongs, determine, based on the flow to which the packet belongs, one or more flow-specific parameters to be used for dynamically determining the respective thresholds, and determine the respective threshold further using the one or more flow-specific parameters.

The packet processor is configured to determine the one or more flow-specific parameters at least by determining respective sets of one or more flow-specific parameters to be used for determining respective ones of the thresholds, including determining a first set of flow-specific parameters to be used for determining the first threshold and determining a second set of flow-specific parameters to be used for determining the second threshold, wherein values of the one or more specific parameters in the first set are different from values of corresponding one or more flow-specific parameters in the second set.

The packet processor is configured to retrieve the one or more flow specific parameters from a memory.

The packet processor is configured to determine the one or more flow-specific parameters at least by determining one or both of (i) a guaranteed dynamic threshold and (ii) an allocation factor for allocation of free buffer space in the buffer memory to the flow to which the packet belongs.

The packet processor is configured to dynamically determine a particular one of the respective thresholds based on (i) a guaranteed amount of buffer space allocated for the flow and (ii) a dynamically calculated amount of buffer space allocated to the flow, the dynamically calculated amount of buffer space being calculated based on the measure of the amount of currently available buffer space in the buffer memory.

The buffer memory is configured to queue packets to be transmitted via ports of the plurality of ports of the network device.

The packet processor is configured to determine the amount of free buffer space by subtracting a value of a counter corresponding to an amount of a total buffer space currently used by queues in the buffer memory from a preconfigured value of a total amount of buffer space in the buffer memory.

The packet processor is configured to determine the amount of free buffer space by subtracting a value of a counter corresponding to an amount of a buffer space currently used by queues corresponding to a port to which the packet is directed from a preconfigured value of a total amount of buffer space in the buffer memory.

The packet processor is configured to determine the first threshold for triggering the first one of the multiple traffic management operations independently from determining the second threshold for triggering the second one of the multiple traffic management operations.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention. For example, one or more portions of methods or techniques described above may be performed in a different order (or concurrently) and still achieve desirable results.

What is claimed is:

1. A method for managing traffic flow to a network device, the method comprising:
    receiving, at a packet processor of the network device, a packet received from a network;
    determining, with the packet processor, at least one port, among a plurality of ports of the network device, via which the packet is to be transmitted from the network device;
    determining, with the packet processor, an amount of free buffer space currently available for buffering packets in a buffer memory configured to queue packets to be transmitted via ones of ports among the plurality of ports of the network device;
    dynamically determining, with the packet processor based at least in part on the amount of free buffer space currently available for buffering packets in the buffer memory, values of respective thresholds for triggering ones of multiple traffic management operations to be performed based on the packet, including dynamically determining a value of a first threshold for triggering a first one of the multiple traffic management operations and a value of a second threshold for triggering a second one of the multiple traffic management operations, to dynamically adjust the values of the respective thresholds based at least in part on a changing amount of free buffer space available for buffering packets in the buffer memory;
    determining, with the packet processor using the respective thresholds, whether or not to trigger ones of the multiple traffic management operations with respect to the packet, including determining, based on a comparison between i) a current fill level of a queue corresponding to the packet and ii) the dynamically adjusted value of the first threshold, whether to trigger the first one of the multiple traffic management operations and determining, based on a comparison between i) the current fill level of the queue corresponding to the packet and ii) the dynamically adjusted value of the second threshold, whether to trigger the second one of the traffic management operations; and
    performing, with the packet processor, one or more of the traffic management operations with respect to the packet determined to be triggered based on the corresponding one of the respective thresholds.

2. The method of claim 1, wherein determining whether to trigger ones of the multiple traffic management operations includes determining two or more of:
    (i) whether to trigger a tail-drop operation to drop the packet,
    (ii) whether to trigger an explicit congestion notification (ECN) operation to include marking in a header of the packet;
    (iii) whether to trigger a flow control message based on the packet, and
    (iv) whether to trigger mirroring of the packet to an analyzer.

3. The method of claim 1, further comprising
    determining, with the packet processor, an egress queue, among a plurality of egress queues, in which the packet is to be queued in the buffer memory;
    determining, with the packet processor, a current fill level of the egress queue;
    comparing, with the packet processor, the current fill level of the egress queue to the respective thresholds; and
    performing, with the packet processor, respective ones of the multiple operations based on the comparison of the fill level of the egress queue to the corresponding ones of the respective thresholds.

4. The method of claim 1, further comprising determining, with the packet processor, a flow to which the packet belongs, wherein dynamically determining the respective thresholds includes
determining, based on the flow to which the packet belongs, one or more flow-specific parameters to be used for determining the respective thresholds, and
determining the respective threshold further using the one or more flow-specific parameters.

5. The method of claim 4, wherein determining the one or more flow-specific parameters comprises determining respective sets of one or more flow-specific parameters to be used for determining respective ones of the thresholds, including determining a first set of flow-specific parameters to be used for determining the first threshold and determining a second set of flow-specific parameters to be used for determining the second threshold, wherein values of the one or more specific parameters in the first set are different from values of corresponding one or more flow-specific parameters in the second set.

6. The method of claim 4, wherein determining the one or more flow-specific parameters comprises retrieving the one or more flow specific parameters from a memory.

7. The method of claim 4, wherein determining the one or more flow-specific parameters comprising determining one or both of (i) a guaranteed dynamic threshold and (ii) an allocation factor for allocation of free buffer space in the buffer memory to the flow to which the packet belongs.

8. The method of claim 1, wherein dynamically determining the respective thresholds includes determining a particular one of the respective thresholds based on (i) a guaranteed amount of buffer space allocated for the flow and (ii) a dynamically calculated amount of buffer space allocated to the flow, the dynamically calculated amount of buffer space being calculated based on the measure of the amount of currently available buffer space in the buffer memory.

9. The method of claim 1, wherein:
the buffer memory is configured to queue packets to be transmitted via ones of ports among the plurality of ports of the network device, and
determining the amount of free buffer space comprises determining the amount of free buffer space by subtracting a value of a counter corresponding to an amount of a total buffer space currently used by queues in the buffer memory from a preconfigured value of a total amount of buffer space in the buffer memory.

10. The method of claim 9, wherein determining the amount of free buffer space comprises determining the amount of free buffer space by subtracting a value of a counter corresponding to an amount of a buffer space currently used by queues corresponding to a port to which the packet is directed from a preconfigured value of a total amount of buffer space in the buffer memory.

11. The method of claim 1, wherein dynamically determining the respective thresholds includes determining the first threshold for triggering the first one of the multiple traffic management operations independently from determining the second threshold for triggering the second one of the multiple traffic management operations.

12. A network device, comprising:
a plurality of ports;
a buffer memory; and
a packet processor coupled to the buffer memory, the packet processor configured to:
receive a packet from a network;
determine at least one port, among the plurality of ports of the network device, via which the packet is to be transmitted from the network device;
determine an amount of free buffer space currently available for buffering packets in the buffer memory;
dynamically determine, based at least in part on the amount of free buffer space currently available for buffering packets in the buffer memory, values of respective thresholds to be used for triggering ones of multiple traffic management operations to be performed based on the packet, the packet processor being configured to dynamically determine a value of a first threshold for triggering a first one of the multiple traffic management operations and a value of a second threshold for triggering a second one of the multiple traffic management operations, to dynamically adjust the values of the respective thresholds based at least in part on a changing amount of free buffer space available for buffering packets in the buffer memory;
determine, using the respective thresholds, whether or not to trigger one of the multiple traffic management operations with respect to the packet, the packet processor being configured to determine, based on a comparison between i) a current fill level of a queue corresponding to the packet and ii) the dynamically adjusted value of the first threshold, whether to trigger the first one of the multiple traffic management operations and determine, based on a comparison between i) the current fill level of the queue corresponding to the packet and ii) the dynamically adjusted value of the second threshold, whether to trigger the second one of the traffic management operations; and
perform one or more of the traffic management operations with respect to the packet determined to be triggered based on the corresponding one of the respective thresholds.

13. The network device of claim 12, wherein the packet processor is configured to determining whether to trigger ones of the multiple traffic management operations at least by determining two or more of:
(i) whether to trigger a tail-drop operation to drop the packet,
(ii) whether to trigger an explicit congestion notification (ECN) operation to include marking in a header of the packet;
(iii) whether to trigger a flow control message based on the packet, and
(iv) whether to trigger mirroring of the packet to an analyzer.

14. The network device of claim 12, wherein the packet processor is further configured to
determine an egress queue, among a plurality of egress queues, in which the packet is to be queued in the buffer memory;
determine a current fill level of the egress queue;
compare the current fill level of the egress queue to the respective thresholds; and
perform respective ones of the multiple operations based on the comparison of the fill level of the egress queue to the corresponding ones of the respective thresholds.

15. The network device of claim 12, wherein the packet processor is further configured to determine a flow to which the packet belongs, determine, based on the flow to which the packet belongs, one or more flow-specific parameters to be used for dynamically determining the respective thresholds, and determine the respective threshold further using the one or more flow-specific parameters.

16. The network device of claim 15, wherein the packet processor is configured to determine the one or more flow-specific parameters at least by determining respective sets of one or more flow-specific parameters to be used for determining respective ones of the thresholds, including determining a first set of flow-specific parameters to be used for determining the first threshold and determining a second set of flow-specific parameters to be used for determining the second threshold, wherein values of the one or more specific parameters in the first set are different from values of corresponding one or more flow-specific parameters in the second set.

17. The network device of claim 15, wherein the packet processor is configured to retrieve the one or more flow specific parameters from a memory.

18. The network device of claim 15, wherein the packet processor is configured to determine the one or more flow-specific parameters at least by determining one or both of (i) a guaranteed dynamic threshold and (ii) an allocation factor for allocation of free buffer space in the buffer memory to the flow to which the packet belongs.

19. The network device of claim 12, wherein the packet processor is configured to dynamically determine a particular one of the respective thresholds based on (i) a guaranteed amount of buffer space allocated for the flow and (ii) a dynamically calculated amount of buffer space allocated to the flow, the dynamically calculated amount of buffer space being calculated based on the measure of the amount of currently available buffer space in the buffer memory.

20. The network device of claim 12, wherein the buffer memory is configured to queue packets to be transmitted via ports of the plurality of ports of the network device, and the packet processor is configured to determine the amount of free buffer space by subtracting a value of a counter corresponding to an amount of a total buffer space currently used by queues in the buffer memory from a preconfigured value of a total amount of buffer space in the buffer memory.

21. The network device of claim 12, wherein the packet processor is configured to determine the amount of free buffer space by subtracting a value of a counter corresponding to an amount of a buffer space currently used by queues corresponding to a port to which the packet is directed from a preconfigured value of a total amount of buffer space in the buffer memory.

22. The network device of claim 12, wherein the packet processor is configured to determine the first threshold for triggering the first one of the multiple traffic management operations independently from determining the second threshold for triggering the second one of the multiple traffic management operations.

* * * * *